RAPID FILM PROCESSOR

Filed June 18, 1958 9 Sheets-Sheet 1

INVENTORS:
Thomas C. Leighton
Malor Wright
By [signature]
Attorney

RAPID FILM PROCESSOR

Filed June 18, 1958 9 Sheets-Sheet 2

INVENTORS:
Thomas C. Leighton
Malor Wright
By [signature]
Attorney

Oct. 30, 1962 T. C. LEIGHTON ET AL 3,060,829

RAPID FILM PROCESSOR

Filed June 18, 1958 9 Sheets-Sheet 3

INVENTORS:
Thomas C. Leighton
Malor Wright
By [signature]
Attorney

INVENTORS:
Thomas C. Leighton
Malor Wright
By [signature]
Attorney

RAPID FILM PROCESSOR

Filed June 18, 1958

INVENTORS:
Thomas C. Leighton
Malor Wright
By [signature]
Attorney

INVENTORS:
Thomas C. Leighton
Malor Wright
By [signature]
Attorney

RAPID FILM PROCESSOR

Filed June 18, 1958

INVENTORS:
Thomas C. Leighton
Malor Wright
By [signature]
Attorney.

INVENTORS:
Thomas C. Leighton
Malor Wright
By Forrest J. Lilly
Attorney

Oct. 30, 1962 T. C. LEIGHTON ET AL 3,060,829

RAPID FILM PROCESSOR

Filed June 18, 1958 9 Sheets-Sheet 9

INVENTORS:
Thomas C. Leighton
Malor Wright

By [signature]
Attorney

United States Patent Office 3,060,829

Patented Oct. 30, 1962

3,060,829

RAPID FILM PROCESSOR

Thomas C. Leighton, South Pasadena, and Malor Wright, Pasadena, Calif., assignors to Hycon Mfg. Company, Pasadena, Calif., a corporation of Delaware Filed June 18, 1958, Ser. No. 742,790
9 Claims. (Cl. 95—89)

This invention relates generally to rapid film processors and more particularly to a means and method for rapidly processing continuously moving exposed film to produce a high quality image for viewing within a short time interval and very small film travel distance.

The usefulness and convenience of immediately viewing a recorded picture is particularly great in reconnaissance systems, especially in an airborne system. Airborne reconnaissance systems are generally quite complex and utilize a variety of components which must all operate correctly and in synchronism. The ultimately required result is, of course, an accurately recorded image usually made on photosensitive film. If the exposed film can be rapidly processed for immediate viewing, it is easily possible to determine if the system is functioning satisfactorily, and that the desired information is being obtained. There are obviously many other uses and benefits in having rapidly processed film in an airborne reconnaissance system as well as in other similar systems.

It is an object of this invention to provide means capable of accomplishing high quality yet rapid processing of continuously moving film.

Another object of the invention is to provide a rapid film processor which can present an image for viewing on continuously moving film within a very short distance from point of film exposure.

Another object of the invention is to provide an applicator which can apply processing solution under turbulent agitation conditions to give enhanced film response to faint exposure light within a very short film processing time interval.

A further object of this invention is to provide a version of rapid film processor requiring only an extremely simple fluid flow system.

Briefly, the foregoing and other objects are preferably accomplished by providing applicator means which can be placed in direct contact with continuously moving film, and which can circulate a high pH monobath through the applicator to the film emulsion under turbulent agitation conditions. The applicator includes suitable seals or barriers which form guard zones that prevent leakage and oxidation of the solution. The monobath is supplied considerably hotter than the ambient air temperature to provide a high environmental processing temperature.

The invention possesses other objects and features, some of which together with the foregoing, will be set forth in the following description of a preferred embodiment of the invention. The invention as described in detail will be more fully understood by reading the description with joint reference to the attached drawings, in which.

Figures 3A, 3B, 3C:
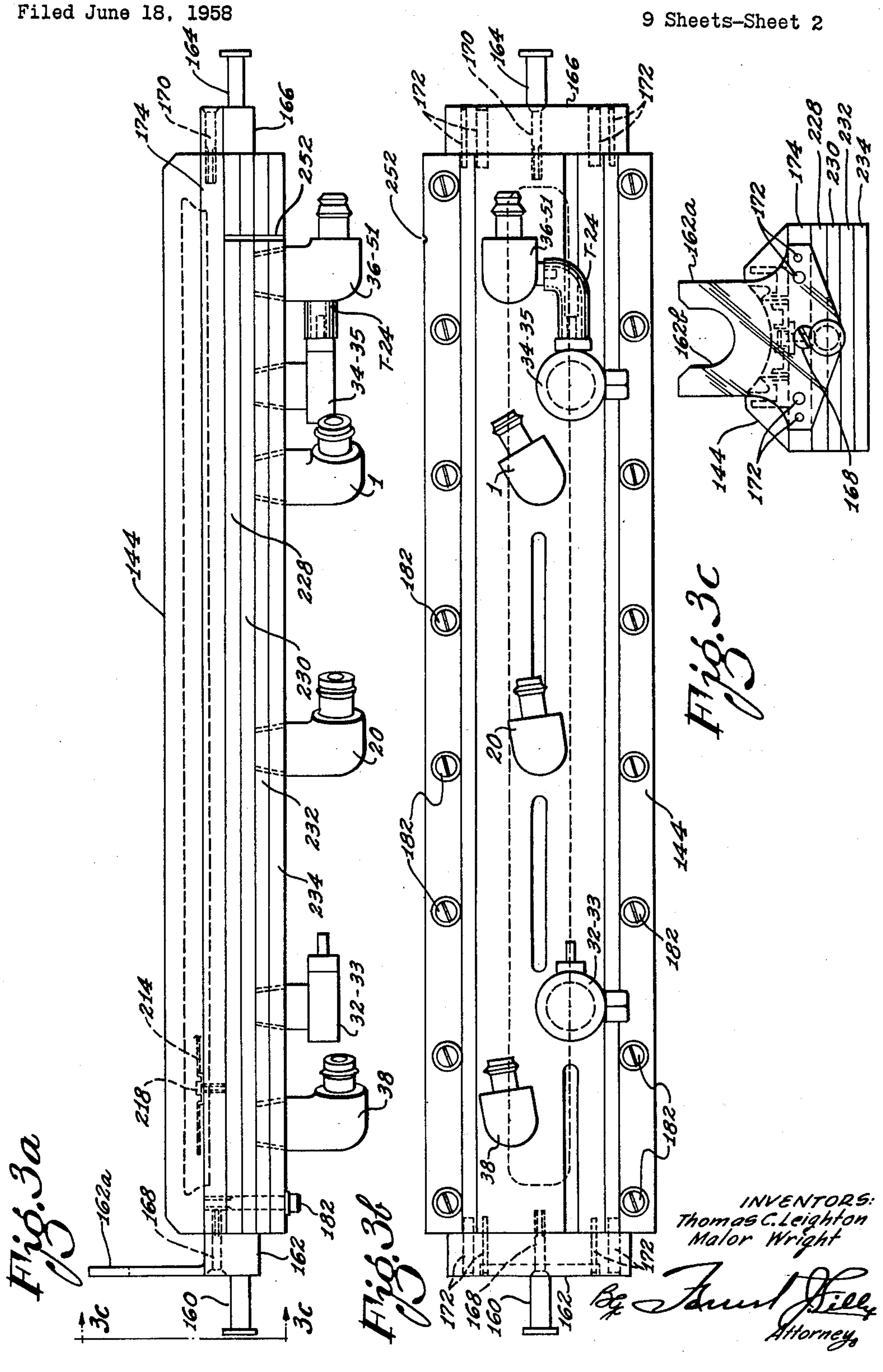
Figure 4A:
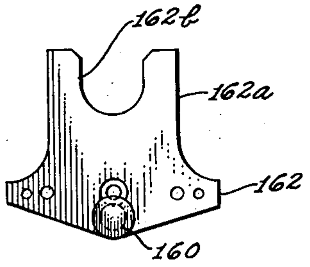
Figure 4B:
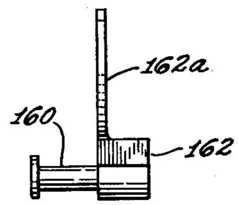
Figure 5A:
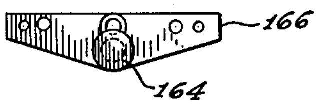
Figure 5B:
Figure 6A:
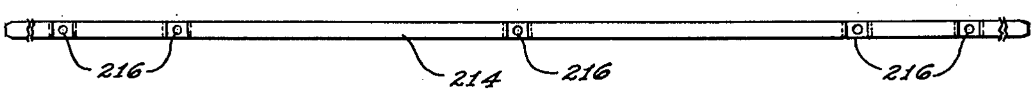
Figure 6B:
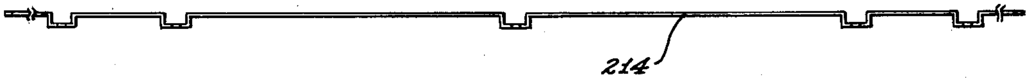
Figure 7A:
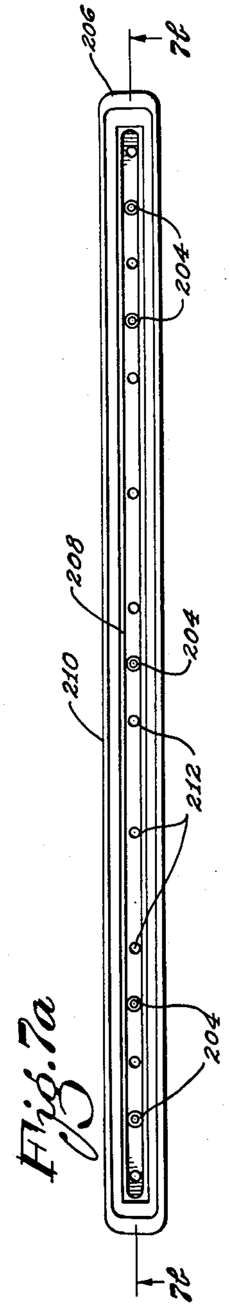
Figure 7B:
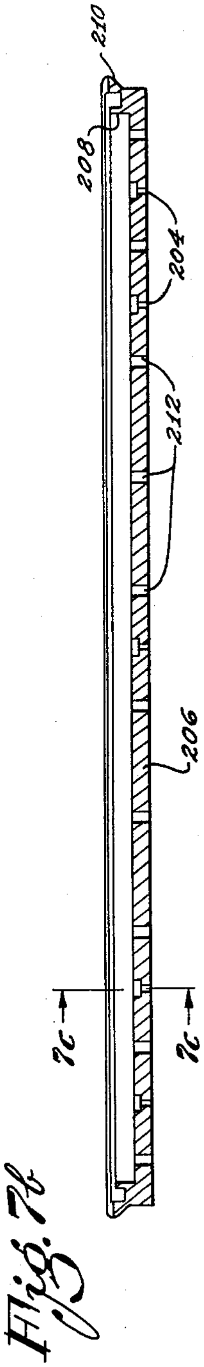
Figure 7C:
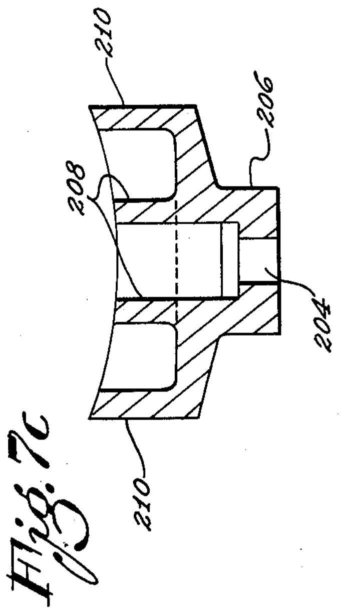
Figures 10A, 10B, 11A, 11B:
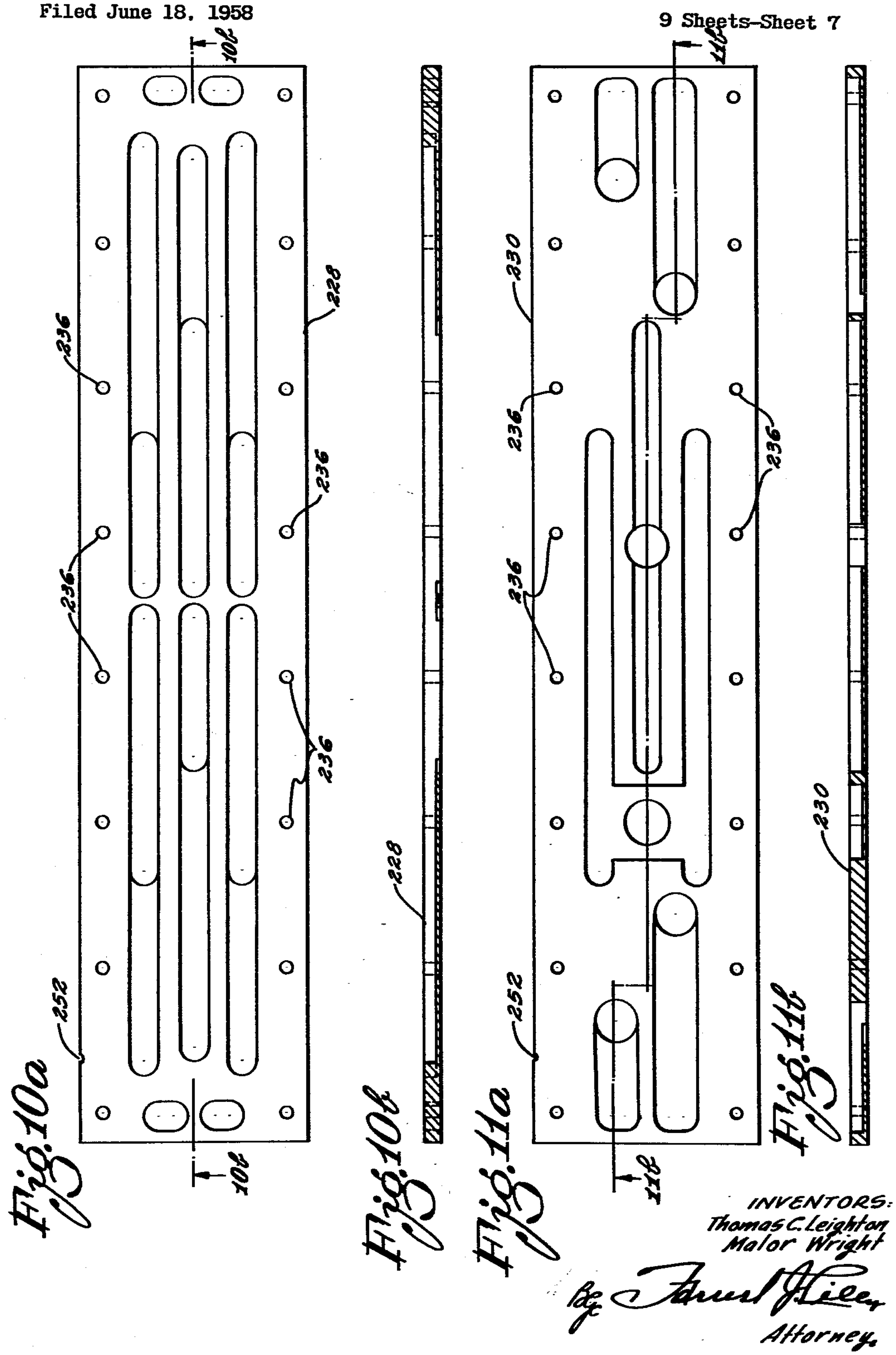
Figure 12B:
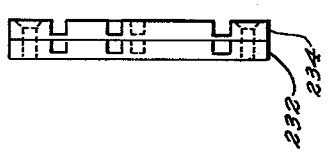
Figure 12A:
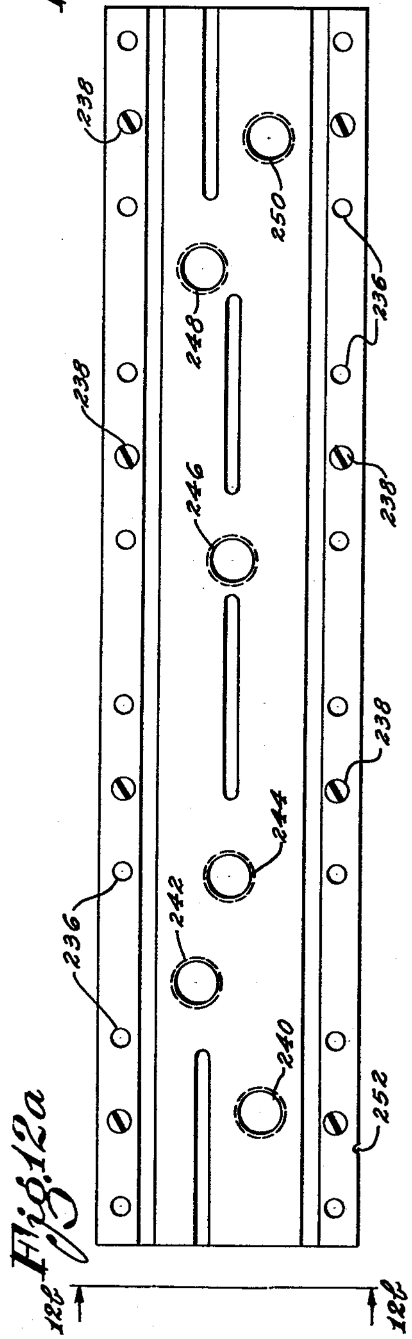
Figure 13:
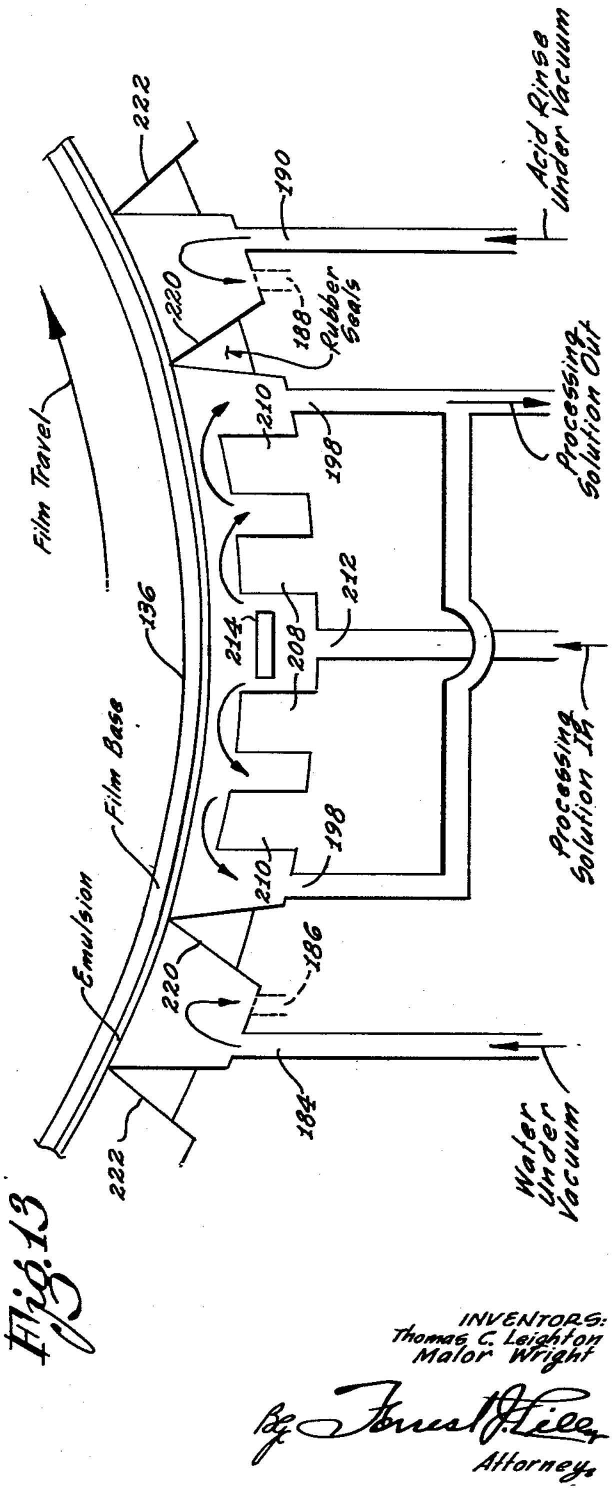
Figure 14:
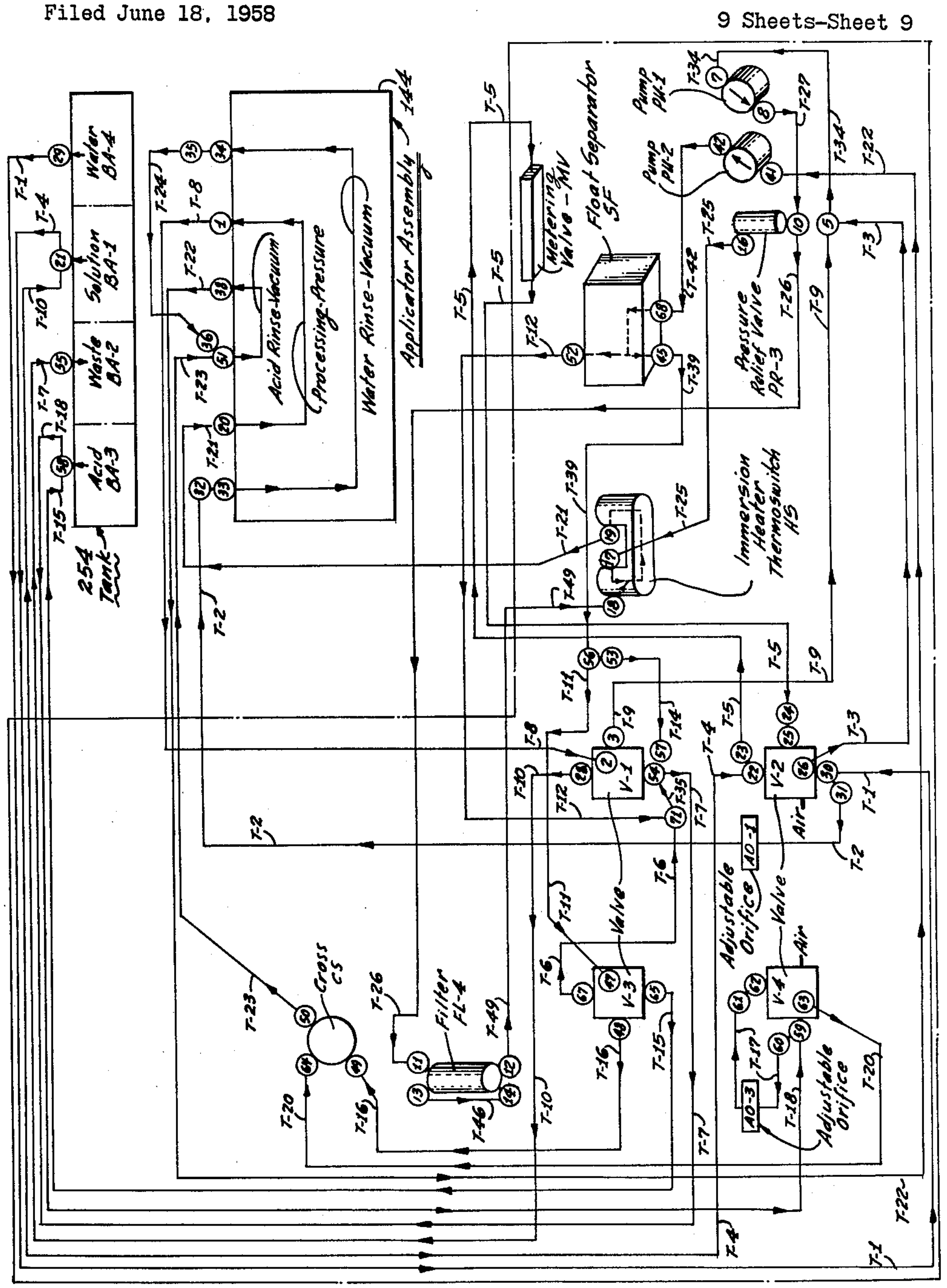

FIGURES 3*a*, 3*b* and 3*c* are respectively side elevation, bottom plan and end elevation views of a preferred embodiment of a version of an applicator assembly for processing continuously moving film;

FIGURES 4*a* and 4*b* are detail views of the left pin bracket member of the applicator assembly;

FIGURES 5*a* and 5*b* are detail views of the right pin block of the applicator assembly;

FIGURES 6*a* and 6*b* are detail views of a spreader strip used in the applicator assembly;

FIGURES 7*a*, 7*b* and 7*c* are detail drawings illustrating a comb structure of the applicator assembly;

FIGURES 8*a*, 8*b*, 8*c* and 8*d* are detail drawings of the applicator base structure;

FIGURES 9*a*, 9*b*, 9*c*, 9*d*, 9*e* and 9*f* are detail drawings which illustrate the rubber seal structure used in the applicator assembly;

FIGURES 10*a* and 10*b* are detail drawings of a manifold plate used in the construction of the applicator assembly;

FIGURES 11*a* and 11*b* are detail views of another manifold plate used with the manifold plate of FIGURES 10*a* and 10*b*;

FIGURES 12*a* and 12*b* are detail views of two more manifold plates which form the last plates in the applicator assembly;

FIGURE 13 is a functional and generally diagrammatic drawing showing different fluid flow (relative to film movement) with the applicator assembly; and FIGURE 14 is a diagram of a preferred fluid tubing arrangement for the rapid film processor.

Figure 1:
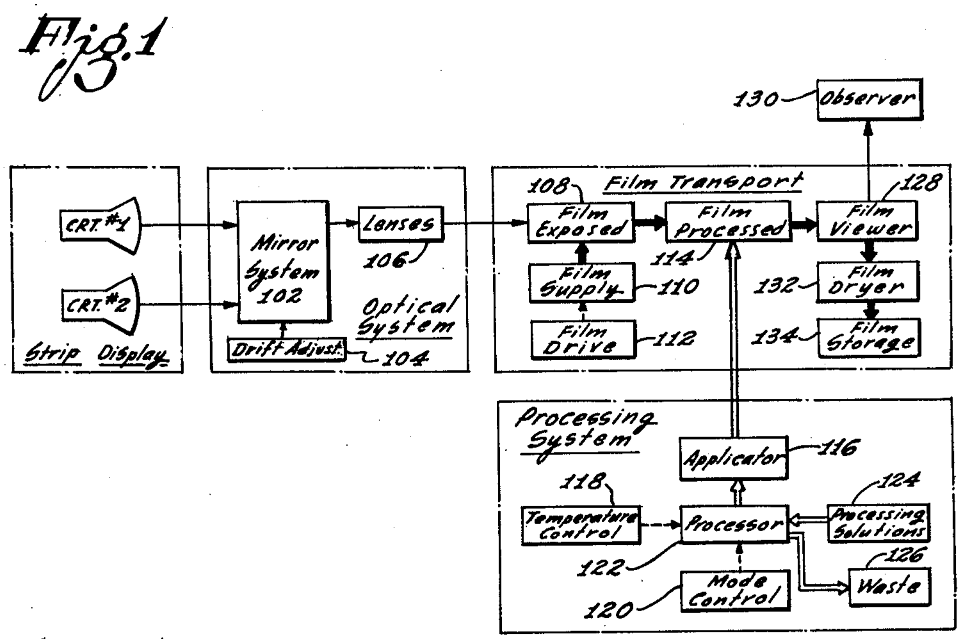
FIGURE 1 is a functional block diagram of the recording and processing section of an airborne radar strip recorder.

A functional block diagram of a section of an airborne radar strip recorder including a rapid film processor is shown in FIGURE 1. Light connecting lines represent optical or visual signals, broken connecting lines indicate mechanical control, film is represented by broad, heavy lines and fluid routing is indicated by broad, unshaded lines. Radar strip images are displayed on two cathode ray tubes CRT #1 and CRT #2. The strip images are suitably reflected by a mirror system 102 which can be adjusted by drift adjustment means 104 to correct for image error caused by aircraft drift. The corrected strip images are focused by lenses 106 to expose 108 film from a film supply 110. The film is moved by film drive 112 and is processed 114 by applicator 116 as it is driven past the applicator 116. Temperature control 118 and mode control 120 by processor 122 of processing solutions 124, which are circulated to the applicator 116 and returned to waste 126, can be made according to film drive speed and operating conditions. The processed film is moved past a film viewer 128 for observation by an observer 130, and is dried by film dryer 132 at the same time. A television camera (not shown) can, of course, be substituted for the observer 130, for further remote transmission. The film is properly stored 134 after it is dried.

Figure 2:
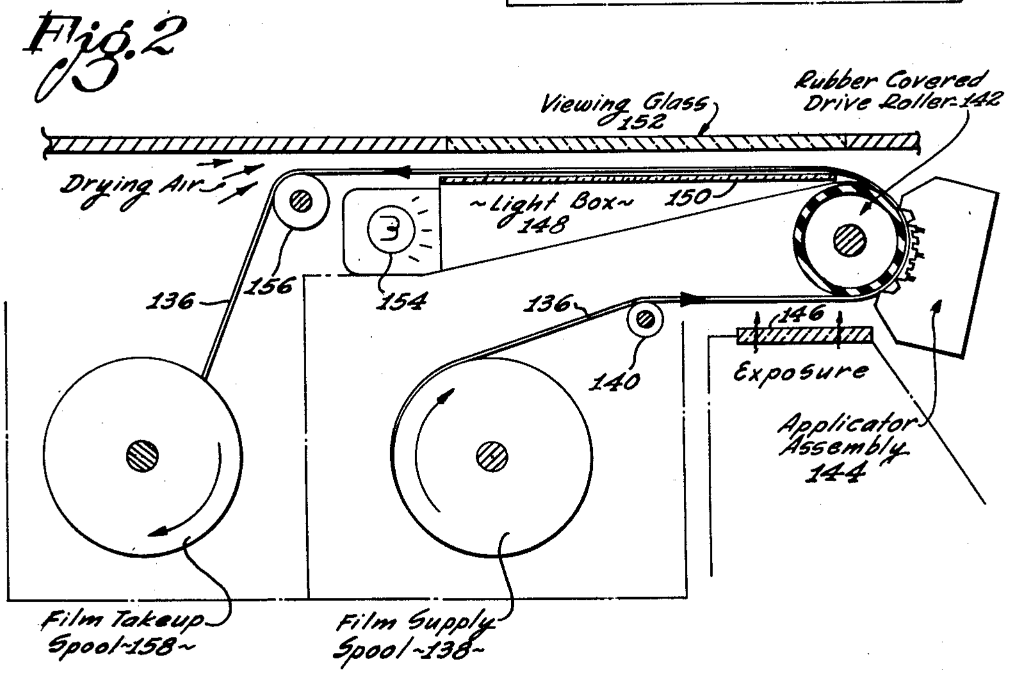
FIGURE 2 is a diagrammatic drawing illustrating in a generally sectional view, a preferred arrangement of a rapid film processor including film transport and viewing systems.

The general structure and arrangement of a preferred embodiment of a rapid film processor is illustrated in FIGURE 2. The illustration is somewhat diagrammatic in nature but is representatively accurate and correct. Light sensitive film 136 is obtained from film supply spool 138 and passed over guide roller 140 and then between rubber covered drive roller 142 and applicator assembly 144 as shown. The film 136 passes in close proximity over a corrector plate 146 parallel to the surface plane of the corrector plate 146. The corrector plate 146 is part of the optical system, and film exposure from cathode ray tube light output is accomplished through this plate 146. The exposed film 136 is processed by solutions circulated through applicator assembly 144 under turbulent agitation conditions to produce a high quality image on continuously moving film within a short exposure-to-view distance. For example, an image on continuously moving 9½ inch wide film having a film velocity variable over a 12 to 1 range, from ½ inch to 6 inches per minute, is presented within two inches of exposure to cathode ray tube light output with this invention.

The exposed film 136 is rapid processed as it moves around drive roller 142 and is ready for viewing when it passes over a light box 148 having a ground glass plate 150 to illuminate the processed film 136. A viewing glass window 152 is provided in the rapid processor housing directly above the light box 148 so that an observer may view the film 136 immediately after processing. A tubular lamp 154 is positioned at an end opposite the drive roller 142 and extends across the width of the light box 148 so that light is directed evenly over the width of the film 136. The light box tapers angularly upwards from lamp 154 as shown to illuminate a rectangular area uniformly. The film 136 passes about guide roller 156 and is wound up by film takeup spool 158. Drying air is blown against the film 136 and passes between the viewing glass 152 and the film section being viewed, to dry the film emulsion. Radiant heat from the light box 148 accelerates the drying process to some extent.

The overall configuration of applicator assembly 144 is shown by FIGURES 3*a*, 3*b* and 3*c*. The applicator structure, however, can be more clearly described with further reference to FIGURES 4*a*, 4*b*, 5*a*, 5*b*, 6*a*, 6*b*, 7*a*, 7*b*, 7*c*, 8*a*, 8*b*, 8*c*, 8*d*, 9*a*, 9*b*, 9*c*, 9*d*, 9*e*, 9*f*, 10*a*, 10*b*, 11*a*, 11*b*, 12*a* and 12*b*. These latter figures are detail drawings showing views of component structure which go to make up the applicator assembly 144. Additional reference to FIGURE 13, which is a diagrammatic and functional schematic of the applicator in operation processing continuously moving film, will complete the applicator description. The applicator assembly 144 as shown in FIGURES 3*a*, 3*b* and 3*c* is an elongated bar-like structure having a support pin at each end. The left end pin 160 is a part of an adjustment bracket 162 which is illustrated independently in FIGURES 4*a* and 4*b* for clarity. The pin 160 can be brazed to a flanged centering arm **162*a* at the base end as shown, and a semicircular slot 162*b* is provided at the other end to receive an adjustment cam as described later. The right end pin 164 is similarly brazed to a wedge shaped block 166** as shown in FIGURES 5*a* and 5*b*. The left pin bracket 162 has four holes (FIGURE 4*a*) drilled in the base end, two holes to each side, and a central countersunk hole is also provided in the base. Similarly, the right pin block 166 (FIGURE 5*a*) has four holes drilled in the sides, two to a side, and a central countersunk hole is also provided in the block 166. The left pin bracket 162 and the right pin block 166 are fastened respectively to the left and right ends of the applicator assembly 144 by screws 168 and 170 which pass through the central countersunk holes in bracket 162 and block 166 (see FIGURES 3*a*, 3*b* and 3*c*). Dowel pins 172 are inserted in the four side holes on both ends.

Bracket 162 and block 166 are actually secured to an applicator base 174 which is illustrated in detail by FIGURES 8*a*, 8*b*, 8*c* and 8*d*. The base 174 is preferably fabricated from corrosion resistant steel and can be seen to be generally in the form of a rectangular shaped plate having two rectangular, closed walls 176 and 178, wall 178 encircling wall 176 as most clearly shown in FIGURE 8*a*. The outer wall 178 is higher along the sides than the sides of the inner wall 176. This is the result of cutting the walls such that they substantially conform (are aligned longitudinally) with the curved, circular surface of a cylindrical roller. The end sections of both walls 176 and 178 are both cut to approximately the same circular radius (FIGURES 8*c* and 8*d*) and a triangular rubber molding is provided over both walls over the complete length with upper apex edge conforming closely to the cylindrical surface of a roller as double enclosed wall seals. This will be described and shown in detail later.

Figure 8A:
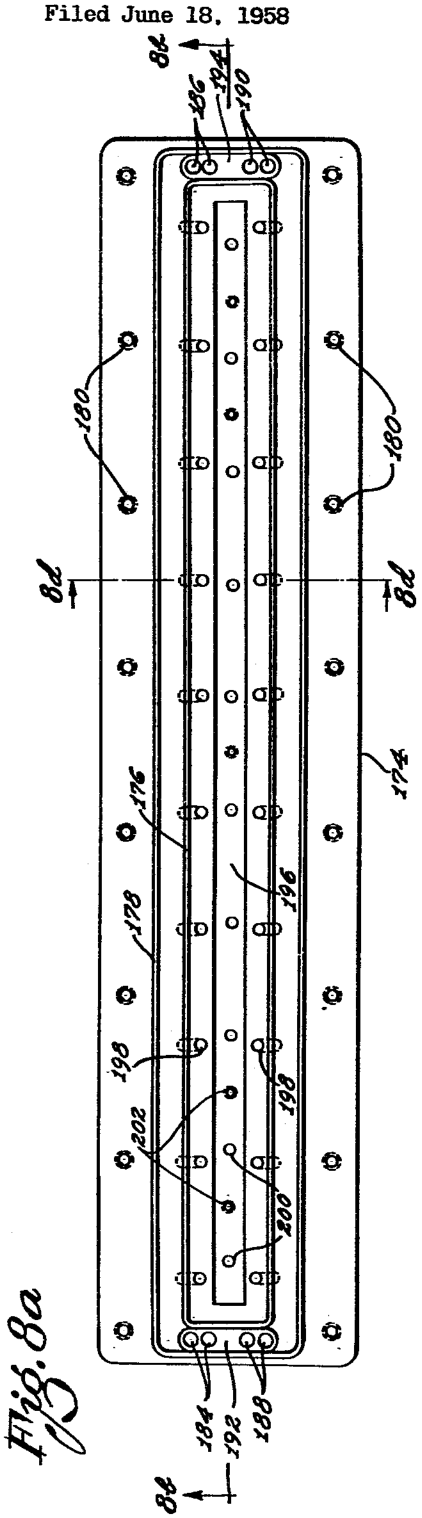
Figure 8B:
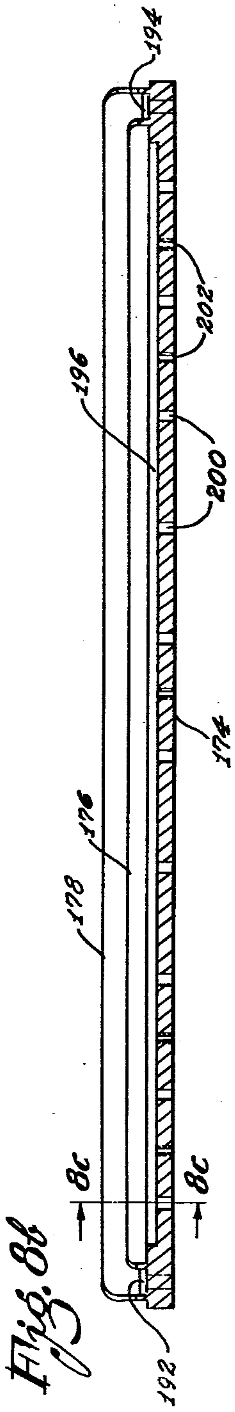
Figure 8D:
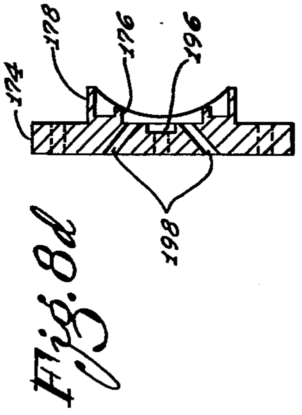
Figure 8C:
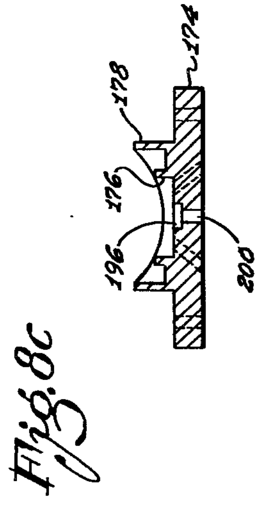

Eight holes 180 are drilled and tapped along each side of the base 174 and are used to receive screws 182 (FIGURES 3*a* and 3*b*) which fasten four manifold plates and base 174 together. Four pairs of holes 184, 186, 188 and 190 are drilled through the two ends of base 174 between the two walls 176 and 178 in recessed rectangular areas 192 and 194 having rounded ends. The four holes at each end are drilled in line in each of the recessed area with a pair of holes located near each rounded end of a recessed area as shown in FIGURE 8*a*, for example. These are water rinse and acid rinse ports which will be functionally described later. A long rectangular recessed area 196 is milled in the center of the area surrounded by the inner wall 176. Ten equally spaced holes 198 are drilled on both sides of the recessed area 196 as shown in FIGURE 8*a*. These holes 198 are drilled slanting outwards as illustrated clearly in FIGURE 8*d*, and are outlet ports for a monobath solution. Ten holes 200 drilled equally spaced along the length of the long rectangular recessed area 196 are the inlet ports for the monobath solution (see FIGURES 8*a*, 8*b* and particularly 8*c*). Interspersed between these holes 200 are five small tapped holes 202 which are to coincide with five countersunk holes 204 in a comb structure 206 illustrated by FIGURES 7*a*, 7*b* and 7*c*.

The comb structure 206 is somewhat similar to the base 174 in that the comb structure 206 also has two upright rectangular walls 208 and 210, 210 encircling 208, and the area enclosed by the inner comb wall 208 is also recessed and has ten equally spaced drilled holes 212 which coincide with the ten monobath inlet holes 200. In fact, the lower base portion of the comb structure 206 is rectangularly shaped so as to fit in the rectangular recessed area 196 of the applicator base 174, such that all he centrally aligned holes will coincide. Detail of the comb structure 206 is clearly illustrated by FIGURE 7*c*. The monobath solution is forced through the ten aligned holes (200 and 212) and passes over the comb walls or riffles 208 and 210, in turn, producing turbulent agitation in the flow of the monobath solution. As the solution is discharged from the ten aligned holes 212, the solution is deflected laterally by a spreader strip 214. The spreader strip 214 is shown in FIGURES 6*a* and 6*b*, and has five drilled holes 216 which can coincide with the five countersunk holes 204 in comb structure 206 and the five tapped holes 202 in the applicator base 174. The spreader strip 214 is placed in the recessed area surrounded by inner comb wall 208, and the spreader strip 214 and comb structure 206 are secured to applicator base 174 by five screws 218 (FIGURE 3*a*, only one screw shown). The holes 204 are countersunk so that the screws 218 can be inserted through easily.

Figures 9A, 9B, 9C, 9D, 9E, 9F:
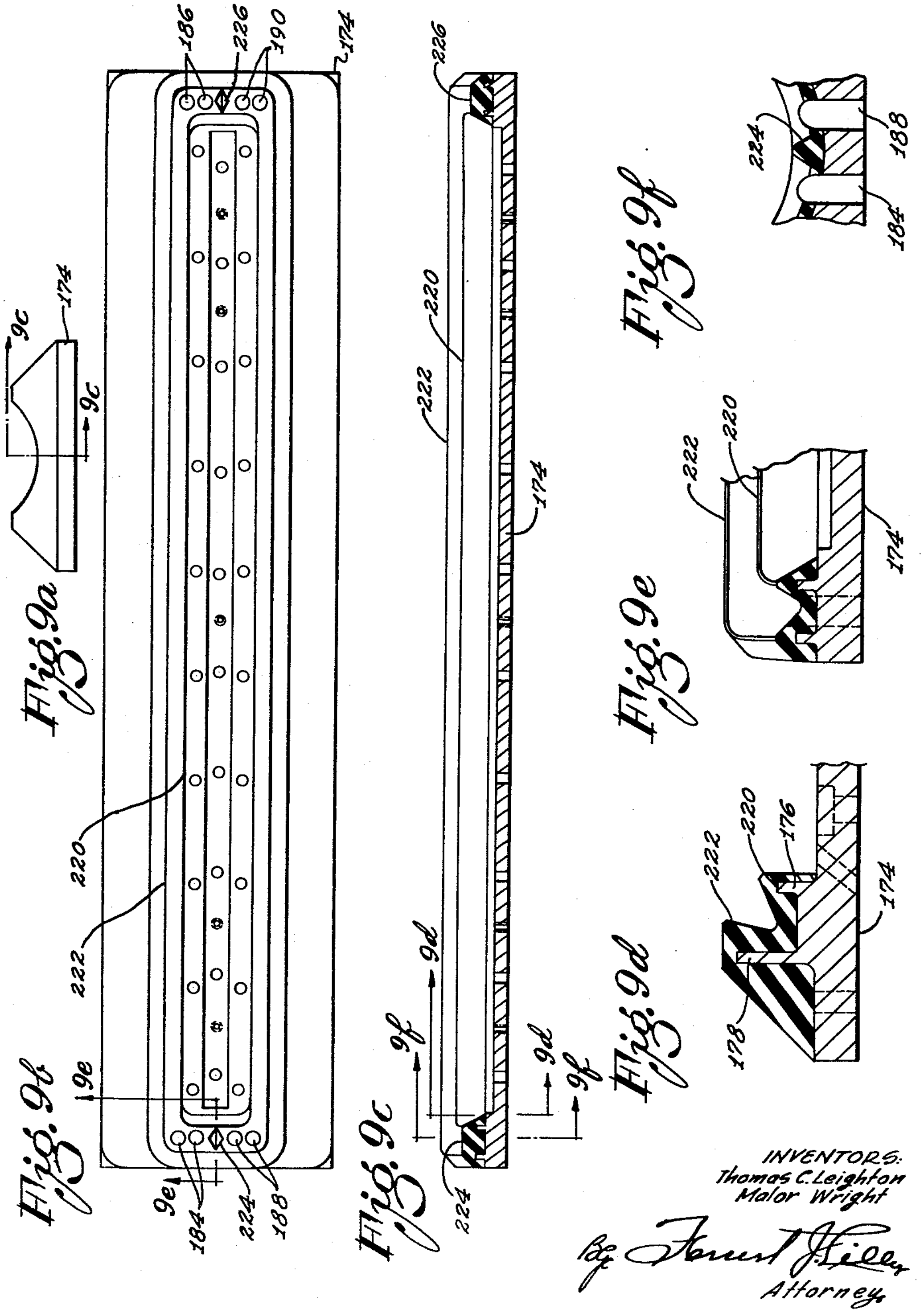

Rubber (or neoprene) triangular cross section seals are compression molded onto the base 174 as shown in FIGURES 9*a*, 9*b*, 9*c*, 9*d*, 9*e* and 9*f*. An end view of base 174 with molded rubber seals is shown in FIGURE 9*a*, and a top plan view of it is shown in FIGURE 9*b*. The four pairs of holes 184, 186, 188 and 190 at the ends of the base 174 are plugged by inserting small pins through the holes, and rubber is then molded in two ridges 220 and 222 over the inner and outer walls 176 and 178, forming a V-shaped groove or channel between rubber seals 220 and 222. The groove between seals 220 and 222 is further divided into two long, separate channels by two knife-edgelike partitions 224 and 226. The partitions 224 and 226 bisect the end channels, between two pairs of holes such as 184 and 188 (FIGURE 9*f*). A sectional view of the partitions can be seen in FIGURE 9*c*. Actually, the cross section of a partition is triangular, as illustrated in FIGURE 9*f*. The holes on both sides of the partition are formed after removing the pins inserted in the four pairs of holes 184, 186, 188 and 190. Cross sectional views through the seals (ridges) are shown in FIGURES 9*d* and 9*e*. Enlarged sectional views of the seals along the sides and ends, respectively, are illustrated. The sectional view of FIGURE 9*e* is shown minus partition 224 for clarity. As can be observed in the enlarged views, the peak of the triangular cross sections are slightly leveled to provide a flat surface which rubs against film moving around a roller. These surfaces are to fit a true cylinder (1.250±.005 inch diameter, for example) within a maximum gap of .001 inch, for example. Thus, as exposed film is moved past the applicator on a drive roller, the rubber seal configuration provides a channel in which water (under vacuum) is passed through a pair of holes 184 at one end, down the channel and out the other end of the applicator through a similar pair of holes 186, to rinse and wet the film. A monobath solution applied under turbulent agitation processes the prepared film within the inner seal 220 and the processed film passes into the trailing edge channel through which an acid rinse solution, with hardener, is provided (under vacuum) in a pair of holes 190 at one end, down the channel and out the other end through a similar pair of holes 188. The water rinse is isolated from the acid rinse by means of the partitions 224 and 226.

The different fluids (solutions) are properly directed to and removed from the various inlet and outlet ports through a manifold comprising four rigid plates 228, 230, 232 and 234 (of polyvinyl chloride, for example) which are suitably machined, stacked together and fastened integrally to the base 174 by screws 182 as shown in FIGURES 3*a*, 3*b* and 3*c*. A number of fittings 1, 20, 32—33, 34—35, 36—51 and 38 connect with the manifold as illustrated in FIGURES 3*a* and 3*b*. These fittings are connected by tubings in a flow system described later. Manifold plate 228 is shown in detail by FIGURES 10*a* and 10*b*, plate 230 by FIGURES 11*a* and 11*b*, and plates 232 and 234 by FIGURES 12*a* and 12*b*. The holes 236 along the sides of the plates 228, 230, 232 and 234 correspond with holes 180 in base 174. Plates 232 and 234 are identical and are shown in subassembly, secured together by screws 238. Six holes 240, 242, 244, 246, 248 and 250 are drilled through plates 232 and 234, and are tapped to receive fittings 36—51, 34—35, 1, 20, 32—33, and 38, respectively. These tapped holes would appear as broken dash lines in FIGURE 12*b* but have been deleted for clarity of illustration. Top plan views of manifold plates 228 and 230 have been shown in FIGURES 10*a* and 11*a*, but the plan view of FIGURE 12*a* is (comparatively) a bottom view of plate 234. A notch 252 has been filed on the sides near a corner of each manifold plate to aid assembly by permitting alignment of the notches as shown in FIGURE 3*a*. The respective manifold plates are fully described by the drawings of FIGURES 10*a*, 10*b*, 11*a*, 11*b*, 12*a* and 12*b*, and a further description of each plate is not believed necessary. The assembly of manifold plates creates suitable passageways which conduct and distribute fluid to and from the applicator in a flow pattern which is simply and schematically depicted in FIGURE 13.

Film travel is indicated by a large arrow in FIGURE 13. The emulsion side of the film 136 moves against the rubber seals 220 and 222 while fluids are directed against and along the emulsion as indicated. Water introduced under reduced pressure into the leading zone initially wets the emulsion as it flows from a pair of holes 184 down the length of the channel between seals and out the pair of holes 186 at the other end of the applicator. Wetting the film first before rapid processing produces uniform or even film development. The prepared film 136 then moves into the processing area within inner seal 220. A processing solution (monobath) emanating centrally along the length of the applicator under pressure is generally deflected laterally by spreader strip 214 which causes the monobath solution to flow sideways over the comb walls or riffles 208 and 210 of the comb structure 206. The riffles reach within less than 1/64 inch, for example, of the emulsion and causes turbulent agitation of the solution against the film 136. Turbulent agitation affects photographic processing by reducing the effective thickness of a so-called "stagnant layer" of the processing solution through which the chemicals must diffuse into and out from the emulsion. Decreasing the thickness of this "stagnant layer" allows faster diffusion and can greatly speed a photographic process and reduce the effects of its reaction products. The monobath solution which recirculates through the processing zone is temperature controlled and continuously replenished.

The water from the leading or wetting zone is actually discharged into the trailing zone, combining with an acid-hardener, and flows in holes 190 through the trailing zone as a rinse solution and out holes 188, similarly as the water originally flowed in the leading zone. The rinse solution also flows through the trailing zone under reduced pressure as does the water in the leading zone. The leading and trailing zones are guard zones having fluid flow under reduced pressure to permit air to leak into the two zones, and thus prevent liquid from leaking out. The processing solution pressure at the inner seal 220 is maintained higher than the pressure in the guard zones, so that guard zone liquids cannot leak into the monobath solution. Thus, a double set of rubber knife edge barriers seal against moving film around a processing zone and form a guard zone around the processing solution to prevent oxidation and leakage. A guard zone fluid constantly washes the inner knife edge seal so that concentrated processing solution cannot form a hard dry residue on the outside of its barrier to scratch the moving film.

Air which may leak into the guard zones because of fluid flow under reduced pressure can be removed from circulation by a separator in the flow system. A preferred flow system used in the rapid film processor is shown in FIGURE 14. The connecting lines represent tubings and the small circles enclosing different numbers represent connecting fittings. When two small circles are positioned together touching each other, for example, the two fittings are either joined directly or closely coupled. The numbers within each circle, of course, identify the various fittings. The applicator assembly 144 is located near a tank 254 which contains separate containers (plastic bags, for example) BA–1, BA–2, BA–3, and BA–4 for the monobath solution, waste, acid-hardener and water, respectively. Two pumps PU–1 and PU–2 are provided as energy sources for the system. The pump PU–1 provides pressure in the processing system generally and the pump PU–2 produces vacuum in the acid rinse flow system which generally affects the water flow system including adjustable orifice AO–1. A pressure relief valve PR–3, filter FL–4 and immersion heater thermoswitch HS are included in the circulating path of processing solution flow, and a float separator SF and a connecting cross CS fitting are included in the acid rinse circulating path. Four valves V–1, V–2, V–3 and V–4 control the operation of the flow system. A metering valve MV is associated with valve V–2 and an adjustable orifice AO–3 is provided for use with valve V–4. All the components except the applicator assembly 144 are generally conventional items.

The four valves V–1, V–2, V–3 and V–4 are conventional valves each having a rotatable, internal connecting elbow or sleeve which can be manually rotated on its main axis by a connecting shaft, so that an opening on an axis generally at right angles to the elbow main axis or sleeve axis can be turned to different directions or angles to connect the axially fixed end opening of the elbow or sleeve with different valve openings at different positions about the side of the valve. Valve V–1 is a four position, three way valve having one port widened by a connecting milled slot such that the elbow or sleeve connects with the same side port in two adjacent, sequential positions of the adjustment shaft. Valve V–2 is a four position, four way valve and V–3 is similar to valve V–1 having a milled slot to widen or extend one port so as to open in two consecutive positions. Valve V–4 is a four position, three way valve in which there is an off (closed) position. The adjustment shafts of all four valves are suitably connected by gearing which can be operated by a single selector handle to rotate all four adjustment shafts simultaneously. The four positions of the valves establish four modes of processor operation including prime, run, rinse and dry.

Film must be in position between the drive roller 142 and applicator assembly 144 before operation of the processor is begun. The mode selector handle is first turned to the prime position before the pumps PU–1 and PU–2 are switched on. The prime mode of operation can be continued for about 20 seconds during which the valve V–1 has its central fitting 2 connected to fitting 28 by the orientation of the valve's internal connecting elbow or sleeve, valve V–2 has its central fitting 26 connected to fitting 22, valve V–3 has its central fitting 47 connected to fitting 65, and valve V–4 has its central fitting 63 connected to fitting 59. Valves V–1 and V–2 permit a main flow of processing solution in the prime mode from container BA–1 from fitting 21 through tube T4 to fitting 22, through valve V–2 and fitting 26 into tube T3 through fitting 5 and into tube T34 to fitting 7 of pump PU–1. The pump PU–1 drives the solution out fitting 8 into tube T27 into fitting 10 through the pressure relief valve PR–3 out fitting 16 into tube T25 to fitting 17 of the immersion heater thermoswitch HS. Fitting 10 of the pressure relief valve PR–3 is also connected to fitting 11 of filter FL–4 by tube T26 so that the solution flows through the filter FL–4 out fitting 12 into tube T49 to fitting 18 of immersion heater-thermoswitch HS and joins with the flow entering fitting 17 of the immersion heater-thermoswitch HS. There is also a small flow of air through bypass tube T46 from fitting 13 to fitting 14 of the filter FL–4. This permits air collected at the top to be expelled into tube T49 by liquid filling the filter. The combined flow into fittings 17 and 18 exits by way of fitting 19 and passes through tube T21 to fitting 20 of the applicator assembly 144. The solution passes through the processing section of the applicator assembly 144 and exits through fitting 1 into tube T8. The other end of tube T8 is connected to fitting 2 of valve V–1 which is set to connect with fitting 28 and tube T10 which is connected back to fitting 21 of tank BA–1. Thus, processing solution is circulated through the applicator assembly 144 from tank BA–1 by pump PU–1. The solution is also filtered and passes through an immersion heater thermoswitch to control the temperature of the circulating solution. The immersion heater in itself, if desired can be located separately in the container BA–1, of course, to heat the processing solution to a sufficiently high temperature.

The valves V–3 and V–4 are set to produce a main flow of acid rinse under vacuum by pump PU–2. Acid-hardener from container BA–3 enters tubing T18 through fitting 58 and into valve V–4 at fitting 59. The valve V–4 has been adjusted so that central fitting 63 connects with fitting 59 and acid-hardener is directed through tubing T20 to a cross connector CS which is actually a T-connector. The acid-hardener exits from fitting 50 and passes through tubing T23 into the acid rinse section at fitting 51 of the applicator assembly 144. The acid-hardener is mixed with a small flow of water from fitting 36 and circulates through the acid rinse section and out fitting 38 into tube T22 which is connected to fitting 41 of pump PU–2 on the other end. The acid rinse passes through pump PU–2 into tube T42 through fitting 42. The other end of tube T42 is connected to fitting 68 of float separator SF and passes out fitting 45 into tube T39, through fitting 56 and tube T11 to central fitting 47 of valve V–3. Fitting 52 is connected to fitting 71 through tube T12 and permits discharge of air collected in the float separator SF when the float has dropped below a given level, opening a valve permitting discharge of air into tube T12. The valve is closed when the liquid level is high (little collected air) and the float is raised above the given level to close the valve. Valve V–3 has been set by the mode selector handle such that fitting 47 is connected with fitting 65 and tube T15 which is connected back to the fitting 58 of container BA–3. A very small flow of acid rinse occurs in tube T14 which is connected to fitting 56 through fitting 53. The other end of tube T14 is connected to fitting 57 which is, in turn, connected to fitting 54 of valve V–1. The very small flow of acid rinse continues through tube T7 to fitting 55 of waste container BA–2. Fitting 55 has a small vent hole to permit escape of air from container BA–2.

A very small flow of water from container BA–4 out fitting 29 into tube T1 also takes place. The water passes through fittings 30, 31, tube T2 through adjustable orifice AO–1 and into fittings 32, 33 of the water rinse section of the applicator assembly 144. The water passes out fittings 34, 35 into tube T24 which is connected on the other end to fitting 51 through fitting 36. Thus, a small amount of water is mixed with acid-hardener under action of pump PU–2 which creates a vacuum condition in the applicator assembly 144. The remaining tubes T5, T6, T9, T12, T16, T17 and T35 are normally inactive lines during the prime mode of operation.

After about 20 seconds of operation in the prime mode during which the lines are properly filled with solution, acid rinse and water, the mode selector handle can be turned to the run position and film movement started. The valve V–1 is rotated so that central fitting 2 connects with fitting 3. Similarly valves V–2, V–3 and V–4 are also actuated such that fitting 26 is connected to fitting 25 in valve V–2, fitting 47 connected to fitting 47 in valve V–3 and fitting 63 connected to fitting 62 in valve V–4. The flow of processing solution is altered by connecting tube T8 to tube T9 through fitting 3 of valve V–1. Tube T10 becomes an inactive line. Since tube T9 is connected directly to tube T34 through fitting 5, the pump PU–1 during the run mode circulates the solution in the lines which were filled during the prime mode. Fresh solution is added in small amounts to the main circulating flow of processing solution at fitting 5 from tube T3, continuously replenishing the main flow from solution overflow or leakage into the guard zones. A very small flow of fresh processing solution in tube T4, through metering valve MV and tube T5, and through valve V–2 to tube T3 passes to fitting 5. The metering valve MV can be simply an adjustable pinch clamp placed on a flexible tube to pinch close the tube as desired. The adjustable orifices AO–1 and AO–3 can be of identical or similar structure to the metering valve MV. Thus, the processing solution is recirculated by pump PU–1, and fresh solution is added in small quantities through metering valve MV during the run mode.

In valve V–3, the central fitting 47 is rotated from fitting 65 to connect with fitting 48. This action activates tube T16 and inactivates tube T15 so that the main flow of acid rinse enters the cross connector CS through fitting 49 and out fitting 50. The connection of central fitting 63 to fitting 62 in valve V–4 causes the flow of acid-hardener from container BA–3 to be directed from tube T18 to T17 through the adjustable orifice AO–3 which reduces the flow of acid-hardener to a small one. This flow of acid-hardener is added to the main flow of acid rinse through tube T20 connecting fitting 63 to fitting 64 of the cross connector CS. The flow of acid rinse is thus similar to the flow of processing solution, and is recirculated by action of pump PU–2 with a small amount of fresh acid-hardener added at the cross connector CS. Other than the noted exceptions, the remainder of the entire flow system functions the same as during the prime mode. When operation is satisfactory, tube T21 will be full of fluid and show rapid fluid motion, tube T22 will show about half fluid and half air, and tube T21 will additionally become warm to the touch after approximately five minutes' operation. Loss of prime is indicated by heavy bubble flow through tubes T22 and T8. This condition requires re-priming to obtain satisfactory processing and to avoid burning out the pump motors. Re-prime is generally necessary only after an exceptionally long run, and is accomplished simply by placing the mode selector to the prime position with the pumps running for about 20 seconds until there is a heavy fluid flow and only light bubble flow in both tubes T22 and T8. The film is preferably stopped to conserve film during this mode of operation.

At the end of a run, shutdown of the system is begun by turning the processor mode selector handle to the rinse position. The film may be left in motion if desired to spool up the last portion of processed film. In the rinse mode, the central fitting 2 of valve V–1 is connected to fitting 54, the central fitting 26 of valve V–2 is connected to fitting 30, the central fitting 47 of valve V–3 is connected to fitting 67, and central fitting 63 of valve V–4 is moved to a closed position. The main flow of processing solution is diverted to waste container BA–2 when central fitting 2 of valve V–1 is connected to fitting 54 and tube T7. Tube T9 becomes inactive and at the same time the very small flow of fresh processing solution from container BA–1 through tubes T4 and T5 is stopped by valve V–2 such that tubes T4 and T5 are rendered inactive. Since central fitting 26 of valve V–2 is now connected with fitting 30, water from container BA–4 is drawn in an increased flow in tube T1 into tubes T3 and T34 by pump PU–1 and delivered to rinse out the entire processing channel to waste.

Connection of central fitting 47 of valve V–3 to fitting 67 diverts the main flow of acid rinse into tube T6, through fitting 71 into tube T35, through fitting 54 into tube T7 and finally waste container BA–2. Tube T16 becomes inactive, and since the small flow of fresh acid-hardener in tubes T18 and T17 is stopped by valve V–4, tubes T20 and T23 also become inactive. The effect of pump PU–2 causes an increased flow of water in tube T2 through the water rinse section of the applicator assembly 144 and through tube T24 into the acid rinse section of the applicator assembly. This, of course, rinses out the acid rinse channels similarly as performed on the processing channels. Fluid flow in the remaining tubes not specifically mentioned is unchanged from the condition prevailing during the run mode. After approximately one minute of operation in the rinse mode, the film drive mechanism is stopped to halt film motion and the mode selector handle then turned to the dry position for another minute before stopping the pumps.

In the dry mode of operation, the valves V–1 and V–3 are effectively unchanged from the rinse mode by virtue of the connecting milled slots described above. However, the valves V–2 and V-4 are connected to atmosphere or air as indicated in FIGURE 14. In this condition, the fluid flow in the lines becomes air mainly. The flow in the processing circuit is changed from water to air by the orientation of the central fitting 26 of valve V–2 to an air port. The air flow produced by pump PU–1 dries out the processing solution channels through to the waste container BA–2. Rotation of valve V–4 from an off position to a port connecting with atmosphere produces a flow of air through tubes T20 and T23 and on through the acid rinse channel to waste by way of tubes T22, T42, T39, T11, T6, T35 and T7. A very small flow of air occurs through tubes T14 and T46. The air flow in tubes T20 and T23 supplants water flow and also causes tubes T1, T2 and T24 to become inactive.. The other lines not specifically mentioned remain in the same condition as they were during the rinse mode. The pumps PU–1 and PU–2 are switched off after one minute and the system generally shut down.

The rapid film processor processes film which has been exposed to, for example, a cathode ray tube operated at a low light output, as the film continuously moves around a drive roller. An image is presented for viewing within two inches of exposure, and the rate of film travel can be variable over a 12:1 range (½ in./min. to 6 in./min.). A high pH, low viscosity monobath recirculated through an applicator with turbulent agitation gives enhanced film response to the faint exposure light within ten seconds, for example. Processing temperature must be considerably hotter than the ambient air temperature with the processor, requiring a processing temperature above approximately 45° C. To maintain a low solution vapor pressure, the processing temperature is limited below about 55° C. A high gamma film process is desirable with the low light intensity used. A continuously replenished acid rinse solution, with hardener, is recirculated through the trailing guard zone of the applicator, and also continuously discharges used rinse solution to waste.

A monobath processing solution contains both developing and fixing agents. If ten second processing is required, development must be essentially complete in 2 to 3 seconds; that is, before fixing is well underway. At the high temperatures necessary for such rapid processing, the chemical changes within the emulsion are diffusion-controlled rather than reaction-controlled as at ordinary processing temperatures, and diffusion time must be short. Thus for this type of monobath process, the reactions are intensely dependent on transient non-equilibrium effects, and the chemistry must take this into account.

The steep gradients in this diffusion-controlled process require the preparation of a solution with a very high concentration of developer radicals in order to give vigorous developing action quickly. A high temperature and high pH for the solution served to increase both the ion partial pressure and chemical activity of the developing agents. Under such conditions sufficient developing agent and activator must be diffused in, and have reduced most of the exposed silver before the fixing agent can act.

Along with the reduction of silver, development results in various reaction products such as bromide ion, semiquinones, etc., which inhibit development. The formation of these development reaction products, and hence their local concentration tends to be proportional to the amount of silver reduced. Thus in rapid processing they mainly inhibit development at points of high density, resulting in lowered gamma (the numerical measure of contrast) and less D max. (maximum density). The turbulent agitation and high temperature assist a rapid outward diffusion of these reaction products. In high density areas this keeps down their inhibiting concentrations during the critical first seconds, and hence directly increases the available gamma and D max. The reaction products of course soon become uniformly distributed throughout the processing solution.

The highly forced developing calls for a very heavy concentration of restraining agents to maintain the selectivity of development. The development reaction products reduce sensitivity mainly because they are produced in temporarily high local concentrations at high density areas. In contrast, the restrainers which are added to the processing solution, enter uniformly into the emulsion. They enhance selectivity because they tend to restrain development mainly in low density regions.

Bromide ion is a useful restrainer, and it is steadily produced by both development and fixing. In the rapidly recirculating flow system with its very slow replacement from the solution supply, advantage of this is taken to allow the halide concentration to build up to a high level. With the addition of other restrainers and excess developer in the supply solution, operation is possible at partial exhaustion for easier control of processing constantcy, to maintain the required high selectivity of development, and extend the life of the solution.

Fixing is accomplished by the normal thiosulfate etc., chelating agents. Their concentration must be carefully chosen to stabilize the image in the time allotted, yet be low enough to act several times slower than the development process and thus not interfere with image formation. Because of the relatively high concentration of dissolved silver recirculated through the solution, a small but significant improvement of the image is gained through solution-physical development.

The film used under the conditions of exposure to a cathode ray tube at a low light output must operate at the toe of the H & D curve of the emulsion. The film should have a thin, pre-hardened emulsion, since vigorous development is necessary, and the film should be capable of being processed to a high gamma.

While some specific dimensions and components have been given as examples above, it is to be understood that the particular embodiment of the invention described above and shown in the attached drawings is merely illustrative of and not restrictive of the broad invention, and that various changes in design, structure and arrangement may be made without departing from the spirit and scope of the broader of the appended claims.

What is claimed is:

1. In a rapid film processor, an applicator, comprising: means for discharging and spreading processing solution in close proximity over an area of film emulsion in a processing area; means for sealing the processing area to prevent leakage and oxidation of solution; means for withdrawing the discharged processing solution from the processing area; means forming a leading guard zone contiguous to the processing area; means for circulating a wetting fluid through the leading guard zone for wetting an area of film emulsion in the leading guard zone; means forming a trailing guard zone contiguous to the processing area; means for circulating an acid rinse through the trailing guard zone for rinsing an area of film emulsion in the trailing guard zone; and manifold means including passageways for directing processing solution, wetting fluid and acid rinse respectively to the processing area, the leading and trailing guard zones, all said means being fabricated into an unitary structure.

2. The invention according to claim 1 wherein said applicator is adapted to operate against film moving about a roller.

3. A rapid film processor, comprising: an applicator having a wetting zone, processing zone and rinse zone; means for moving exposed film progressively through the wetting, processing and rinse zones; a supply of water; means for circulating water through the wetting zone of said applicator; a supply of processing solution; means for recirculating a quantity of processing solution through the processing zone of said applicator; means for continuously replenishing the recirculating processing solution with small amounts of fresh solution; means for combining acid-hardener with water for an acid rinse; means for recirculating a quantity of acid rinse through the rinse zone of said applicator; and means for continuously replenishing the recirculating acid rinse with small amounts of fresh acid rinse.

4. The invention according to claim 3 including, in addition, means for heating and maintaining the recirculating processing solution to a temperature above approximately 45° C. and below approximately 55° C.

5. A rapid film processor, comprising: means for moving a length of exposed film continuously past a processing area; means for applying processing solution under turbulent agitation conditions to an area of film emulsion in the processing area, said means for applying processing solution including an applicator comprising means for continuously discharging and spreading processing solution in close proximity over the area of film emulsion, means positioned in the spreading path of the processing solution to produce turbulent agitation of the solution against the area of film emulsion, means for sealing the processing area to prevent leakage of solution, and means for withdrawing the discharged processing solution from the processing area; and means for continuously circulating the processing solution under pressure through the processing area, whereby exposed film in the processing area is rapidly processed.

6. The invention according to claim 5 including, in addition, means spaced apart from said processing area sealing means and surrounding the same for a secondary seal, the intervening space being adapted for use as guard zones about the processing area.

7. A rapid film processor, comprising: means for moving a length of exposed film continuously past a processing area; means for applying processing solution under turbulent agitation conditions to an area of film emulsion in the processing area, said means for applying processing solution including an applicator comprising means for discharging and spreading processing solution in close proximity over an area of film emulsion in a processing area, means for sealing the processing area to prevent leakage and oxidation of solution, means for withdrawing the discharged processing solution from the processing area, means forming a leading guard zone contiguous to the processing area, means for circulating a wetting fluid through the leading guard zone for wetting an area of film emulsion in the leading guard zone, means forming a trailing guard zone contiguous to the processing area, means for circulating an acid rinse through the trailing guard zone for rinsing an area of film emulsion in the trailing guard zone, and manifold means including passageways for directing processing solution, wetting fluid and acid rinse respectively to the processing area, the leading and trailing guard zones, all said means being fabricated into a unitary structure; and means for continuously circulating the processing solution under pressure through the processing area, whereby exposed film in the processing area is rapidly processed.

8. The invention according to claim 7 wherein said applicator is adapted to operate against film moving about a roller.

9. In a rapid film processor having continuously moving film, an applicator for applying processing solution under turbulent agitation conditions to an area of film emulsion in a processing area, comprising: means for continuously discharging and spreading processing solution in close proximity over the area of film emulsion; means positioned in the spreading path of the processing solution to produce turbulent agitation of the solution against the area of film emulsion; means for sealing the processing area to prevent leakage of solution; means for withdrawing the discharged processing solution from the processing area; and means spaced apart from said processing area sealing means and surrounding the same for a secondary seal, the intervening space being adapted for use as guard zones about the processing area.

References Cited in the file of this patent

UNITED STATES PATENTS

| | | |
|---|---|---|
| 1,451,065 | Dye | Apr. 10, 1923 |
| 1,840,351 | Douden | Jan. 12, 1932 |
| 1,895,760 | Hunt | Jan. 31, 1933 |
| 2,373,114 | Goldsmith | Apr. 10, 1945 |
| 2,419,853 | Pask | Apr. 29, 1947 |
| 2,446,668 | Tuttle | Aug. 10, 1948 |
| 2,548,573 | Wampole | Apr. 10, 1951 |
| 2,586,772 | Ashby | Feb. 26, 1952 |
| 2,665,619 | Tuttle | Jan. 12, 1954 |
| 2,755,715 | Tuttle | July 24, 1956 |
| 2,780,974 | Fairbank | Feb. 12, 1957 |
| 2,856,829 | Orlando | Oct. 21, 1958 |
| 2,945,494 | Tyler et al. | Oct. 18, 1960 |